Patented Aug. 18, 1942

2,293,676

UNITED STATES PATENT OFFICE 2,293,676

METHOD OF SEPARATING FATTY ACIDS

Latimer D. Myers, Cincinnati, and Victor J. Muckerheide, Silverton, Ohio, assignors to Emery Industries, Inc., Cincinnati, Ohio, a corporation of Ohio No Drawing. Application July 29, 1940, Serial No. 348,246

8 Claims. (Cl. 260—419)

This invention relates to a method of separating mixed higher fatty acids one from another. This method is of particular utility for treating fatty acid stocks of the type which are used to obtain the stearic and oleic acids of commerce. These products are produced from materials such as tallow, brown grease, garbage grease, and the like; and they are termed animal fatty acids, the term denoting their origin to distinguish them from fatty acids derived from vegetable sources.

Oleic acid is a liquid, sometimes called red oil. Commercial stearic acid is a waxy solid. While the solid acid component of animal fatty acid is termed stearic, it is in fact comprised predominantly of stearic acid and palmitic acid, and these two components are present in typical animal fatty acids in a characteristic ratio, approximating what is commonly termed the eutectic mixture, 52.5% of palmitic and 47.5% of stearic acid, although the exact ratio varies somewhat with each specific stock. In the past, it has been impossible to separate the stearic and palmitic acids from one another, and the primary products of the fatty acid industry have, therefore, been glycerine, oleic, or red oil, and commercial stearic acid.

The object of the present invention has been to provide a process for separating stearic acid and palmitic acid from one another and also to provide a process for separating the red oil from the solid acid bodies.

In the manufacture of commercial stearic acid in the past, the natural fats are chosen and blended to constitute a batch in which the solid fatty acids will have a ratio of 47.5% stearic acid to 52.5% palmitic acid; the reason for maintaining this eutectic ratio subsequently is explained. After blending or selection, the fats are split into fatty acids and separated from the glycerine water. In many cases the fatty acids are then distilled to improve color and purity. Next, the mixed fatty acids are poured into pans to solidify, and are then chilled to approximately 40° F. The cakes so formed are wrapped in burlap, and pressed in large hydraulic presses. This operation removes a substantial percentage of the oleic acid, but by no means all of it, due to mechanical entrainment and collapse of the cake. These cakes are remelted, recast and pressed a second time at an elevated temperature, such as 100° F., to remove additional oleic acid. This is called the hot pressing operation to distinguish it from the first pressing operation which is known as cold pressing.

At the temperature of the hot pressing operation, the solid fatty acids are soluble in the red oil, and so the red oil fraction from the hot pressing operation contains too high a percentage of solid fatty acids to be used for the purpose for which red oil is normally desired. This hot press red oil, therefore must be reworked by further treatments or reincorporation with new batches of mixed fatty acids before it can become a useful commercial product.

If the indicated ratio of stearic to palmitic acid be not observed, the mixed fatty acids do not form the best crystal structure upon chilling, and it is difficult to separate the red oil from the solid acid components. On this account, very little latitude is permissible, either in respect to the fats chosen to be processed, or in the composition of the ultimate products.

The commercial process just described is slow and expensive, and requires careful control and selection of the initial raw material to provide a balance which, ultimately, may not be desirable in the final product. Moreover, the number of raw fats and oils which may be combined or blended to provide the eutectic mixture is very limited. The process and the attendant commercial conditions, which have just been described, have existed for a period exceeding fifty years, and, outside of the development of the Twitchell fat splitting reagent, there has been little or no progress in the industry despite the urgent need for fatty acid fractions different from commercial stearic.

The present invention consists in producing substantially zero titre oleic acid, that is, one having a titre of between plus two and minus two, by removing the solid fatty acids from the oleic acid by solvent separation. We have also discovered that it is possible to fractionate the solid fatty acids in the course of separating them from the liquid fatty acids by dissolving the mixed fatty acids in a solvent, then crystallizing the solid acids and separating them from the liquid acids in two or more steps at progressively lower temperatures. By this method, it is possible to obtain solid fatty acid fractions, higher in stearic acid than palmitic acid, and other fatty acid fractions higher in palmitic acid than in stearic acid and different from eutectic mixes. As many steps as desired may be employed and a corresponding number of fractions recovered.

Though it has been known for fifty years or more that a separation of solid and liquid fatty acids could be made, at least approximately, by a method of this type, still the practical art has pursued universally the still older method of effecting the separation by pressing operations. Our investigation indicates that one reason for the inapplicability of the proposed solvent separation process to commercial production has resided in the difficulty of obtaining precipitates susceptible to being filtered and washed in large scale production. We have determined that in order to obtain a substantially zero titre red oil, and useful solid acid components, it is desirable to use a polar type of solvent which is water miscible, such as methyl alcohol, ethyl alcohol, isopropyl alcohol, acetone, etc., that the water content of the solvent should not exceed 15% by weight, and that the concentration of the fatty acids in the solvent should not materially or substantially exceed 30% by weight. If the solvent be used with too much water present, then the separation of the solid fatty acids from the oleic acid is less than complete, so that the oleic acid is no better than that obtained by properly conducting pressing operations. If the concentration of fatty acids in solvent be too high, then the precipitate tends to form a slimy mass which cannot be handled or washed except perhaps in small quantities under laboratory conditions.

In order to apply the principle of solvent separation to commercial production of the animal fatty acids, it is requisite that the total amount of solvent employed in conducting the operation be not so great that its initial cost, its loss, its recovery costs and general handling will elevate the cost of the process above that of the presently utilized pressing methods. We have determined that it is feasible and practical, commercially, in large scale operations, to remove the solid from the liquid fatty acids by utilizing a concentration of acids in solvent of substantially 25 to 30% and by maintaining the strength of the solvent at 85 to 95%. These conditions provide a superior oleic acid, inhibit the entrainment of an undue quantity of oleic acid in the solid precipitate, and produce solid fatty acids suitable for various commercial uses.

The invention also comprises the fractionating of the solid fatty acids. Though this may be done where desired, apart from and independently of the solid and liquid fatty acid separation, still it is advantageous in many respects to perform the two operations conjointly. In order to do this, the solution is first chilled below the precipitating point of stearic acid, the first precipitate is filtered and washed, and then the solution is further chilled and the precipitate again filtered. In this manner, any desired number of fractions may be obtained.

The degree of each drop of temperature is determined by the end products desired. Fractions tending to be higher in stearic come out of solution first, and the fractions higher in palmitic at the lower temperatures.

In general, the fractions dominately high in palmitic are more difficult to wash because of a tendency of them to entrain oleic acid. Such fractions are particularly suitable for soap making stocks because of the great tendency to lather in soaps made from palmitic acid. Where greater purity is desired, these fractions high in palmitic may be recrystallized from solution to reduce their content of oleic acid.

Typical examples of the practice of this process are as follows:

*Example 1*

A distilled fatty acid stock is prepared by splitting and distilling inedible tallow. This stock may have a titre of 42° C. and an iodine value of 54.2. The stock is heated to a temperature of about 120° F. and pumped at a rate of 2000 pounds per hour, together with 4666 pounds per hour of 90% aqueous methyl alcohol at a temperature of 70° F. through a chilling unit. Here the mixture of alcohol and fatty acids is cooled from a temperature of about 85° F. to a temperature of 10° F. The chilled solution now containing precipitated solid acids is filtered continuously and washed with about 1700 pounds per hour of 90% aqueous methyl alcohol at a temperature of plus 10° F. From the 2000 pounds per hour of fatty acids, there is obtained 1100 pounds per hour of oleic acid of 1.0° C. titre and 900 pounds per hour of stearic acid having iodine value of 3.5.

*Example 2*

Distilled fatty acid stock prepared from a mixture of 75% tallow and 25% garbage grease is heated at a rate of 2000 pounds per hour and 4666 pounds per hour of 90% aqueous methyl alcohol. The solution is chilled in three steps. In the first chiller, the temperature may be reduced from 85° F. to 72° F., and solid acids precipitated are removed by filtration. The solution next is chilled to 55° F. and filtered a second time to recover a second fraction. The temperature finally is lowered in the third chiller to plus 10° F. and again filtered to recover a third fraction. Each of the filter cakes is washed with fresh 90% methyl alcohol at a temperature approximately equal to the filtration temperature of the slurry. The quantity of wash alcohol used in each case may amount to approximately 1000, 2000, and 1000 pounds respectively. The filter cakes are melted and the alcohol removed therefrom by evaporation in order to recover three fractions of solid acids, and the filtrate from the last filtration is evaporated to recover the oleic acid. From this process, there is obtained 200 pounds per hour of stearic acid, having a high stearic content and having a 57° melting point and a 3.1 iodine value. The second fraction may amount to 400 pounds, having a 55° C. melting point and a 6.0 iodine value. The third fraction, 200 pounds, has a 51° C. melting point and a 17.7 iodine value. The recovered oleic acid, some 1200 pounds, has a zero degree centigrade titre. All the above quantities referred to pounds output per hour.

*Example 3*

Commercial stearic acid having an iodine value of from six to seven is processed at the rate of 600 pounds per hour together with 5400 pounds per hour of 90% aqueous methyl alcohol. The stearic acid is held at a temperature of 140° F. and the methyl alcohol at a temperature of 90° F. The alcoholic solution is cooled in three stages by means of a chiller. In the first stage, the temperature is reduced to 82° F., in the second stage the solution is cooled to 60° F., and in the third stage to 10° F. The precipitated solid acids are removed by continuous filtration after each chilling step. The following products are obtained: 150 pounds per hour of high stearic content solid acids, having a melting point of 61° C. and an iodine value of 2; a second fraction amounting to 300 pounds, having a melting point of 55° C. and an iodine value of 2.1; and a third fraction amounting to 150 pounds and having a melting point of 56.5° C. and an iodine value of 3.1. The filtrate from the last filter is distilled in order to remove the slight amount of oleic acid contained therein, and the recovered solvent returned to the cycle.

Having described our invention, we claim:

1. The method of fractionating stearic and palmitic acids from a batch of mixed fatty acids in which the solid fatty acids have a ratio one to the other approximating that of animal fat, said process comprising, establishing a solution of the fatty acids in a solvent which is miscible with water and which contains a substantial amount of water but an amount not exceeding substantially 15% thereof by weight, the amount of fatty acid dissolved in the solvent being such that the concentration thereof in the solvent solution does not exceed substantially 30%, lowering the temperature of said solvent solution to precipitate a portion of the solid fatty acids therein, which precipitated portion is substantially richer in stearic acid relative to palmitic acid than the starting mixture of stearic and palmitic acids, removing the portion so precipitated from the solution, again lowering the temperature of the solution, thereby precipitating a second fraction of fatty acids from the solution in which second fraction the ratio between stearic and palmitic acids is different from the ratio in the first precipitated fraction as well as the starting mixture, and then separating the second fraction of fatty acids so precipitated.

2. The method of obtaining fatty acid fractions relatively rich in stearic and palmitic acids from a mixture of the same derived from animal fat, said method comprising dissolving said mixture in a organic solvent which is miscible with water and which contains a substantial amount of water but an amount not exceeding substantially 15% by weight thereof, the said mixed fatty acids dissolved in the solvent being so controlled as to amount that the concentration thereof in the solvent does not exceed 30% by weight of the solvent solution, then chilling the solution three times successively at progressively lower temperatures, and filtering the precipitate and washing the precipitate with fresh solvent containing water but no fatty acids each time the temperature of the first chill being adapted to provide a fraction substantially richer in stearic than in palmitic acid, a second chill providing a second fraction approximating that of the eutectic mixture of stearic and palmitic acids, and a third chill providing a second fraction substantially richer in palmitic than in stearic acid.

3. The method of separating the stearic and palmitic acid components of commercial stearic acid, which method comprises dissolving commercial stearic acid in methyl alcohol which contains a substantial amount of water but an amount not exceeding 15%, the amount of commercial stearic acid so dissolved being such that the concentration of the commercial stearic acid in the solvent solution is approximately 10%, then progressively lowering the temperature of the solution in steps to effect precipitation of successive crops of crystals respectively decreasingly richer in stearic acid and increasingly richer in palmitic acid, separating each crop of crystals so precipitated, washing each crop of crystals with methyl alcohol solvent which does not contain fatty acids at a temperature substantially the same as the temperature at which that crystal crop was precipitated from the solution, and, after removing the last crop of crystals from the solvent solution, separating the solvent from those fatty acids remaining in the solvent solution.

4. The method of separating the stearic and palmitic acid components of commercial stearic acid, which method comprises dissolving commercial stearic acid in methyl alcohol which contains a substantial amount of water but an amount not exceeding 15%, the amount of commercial stearic acid so dissolved being such that the concentration of the commercial stearic acid in the solvent solution is approximately 10%, then lowering the temperature of the solvent solution sufficiently to obtain a crop of crystals which is richer in stearic acid than the proportion of stearic to palmitic acid of the original mixture, thereby leaving in solution fatty acids which are richer in palmitic acid than the ratio between stearic and palmitic acid of the original mixture, removing the crystals by filtration, washing the crystals with methyl alcohol solvent that does not contain fatty acids at a temperature substantially the same as the temperature at which the crystal crop was precipitated from the solution, and finally recovering the fatty acids remaining in the solvent solution from the solvent solution.

5. The method of recovering substantially zero titre oleic acid and fractions respectively rich in stearic and palmitic acids from a batch of mixed fatty acids derived from animal fat, which method comprises dissolving the batch of mixed fatty acids in an organic solvent which is miscible with water and which contains a substantial amount of water but an amount not exceeding substantially 15% by weight of it, with the amount of fatty acids dissolved in the solvent not exceeding substantially 30% by weight of the solvent solution, lowering the temperature of the solvent solution sufficiently to obtain a crop of filtrable, washable crystals substantially higher in stearic acid than the ratio between stearic acid and palmitic acid in said mixture, and removing said crystals by filtration, further chilling the solution to obtain a second crop of washable, filtrable crystals richer in palmitic acid than the first fraction, removing the second crop of crystals by filtration, lowering the temperature still further to precipitate a third friction richer in palmitic than the said mixed fatty acids, the last temperature also being sufficiently low to cause precipitation of substantially all the fatty acids which are normally solid then remaining in the solution so as to leave substantially only oleic acid dissolved in the solvent, and finally separating the solvent from the oleic acid.

6. The method of obtaining substantially zero titre oleic acid from a mixture of fatty acids derived from animal fat, the said method comprising dissolving the mixture of fatty acids in an organic solvent which is miscible with water and which contains a substantial amount of water but an amount not exceeding substantially 15% by weight of the solvent, the amount of fatty acids dissolved in said solvent being so controlled as not to exceed substantially 30% by weight of the solvent solution, lowering the temperature of the solution to a temperature of approximately 10° F. thereby causing substantially all of the acids in the mixture which normally are solid to be precipitated in the form of filtrable, washable crystals, and thereby leaving substantially zero titre oleic acid dissolved in the solvent, removing said crystals by filtration and subsequently removing the solvent from the oleic acid.

7. The method of separating individual fatty acid bodies from a mixture of animal fatty acids, the said method comprising dissolving a mixture of the fatty acids in aqueous methyl alcohol, the water content of which does not exceed approximately 15% by weight thereof, the amount of fatty acids dissolved being such that the concentration of mixed fatty acids in the solvent solution does not exceed substantially 30%, lowering the temperature of the solution to a point which causes the precipitation from the solution of a dominant portion of one of the fatty acid bodies contained therein in the form of filtrable and washable crystals, washing the crystals with methyl alcohol maintained at a temperature approximating that at which the crystals precipitated from the solution, and recovering the washed crystals.

8. The method of separating mixed solid fatty acids from animal fat one from the other, said method comprising dissolving the mixed fatty acids in aqueous methyl alcohol, the water content of which does not exceed approximately 15% by weight thereof, in such amounts that the concentration of the mixed fatty acids in the alcohol does not exceed approximately 30% by weight of the solvent solution, chilling the solution to a temperature sufficient to cause precipitation of crystals consisting predominantly of stearic acid, and recovering the fatty acids residing in the solvent after precipitation from the solvent.

LATIMER D. MYERS.
VICTOR J. MUCKERHEIDE.

CERTIFICATE OF CORRECTION.

Patent No. 2,293,676. August 18, 1942.

LATIMER D. MYERS, ET AL.

It is hereby certified that error appears in the printed specification of the above numbered patent requiring correction as follows: Page 3, first column, line 51, claim 2, for the word "second" read --third--; and second column, line 48, claim 5, for "friction" read --fraction--; and that the said Letters Patent should be read with this correction therein that the same may conform to the record of the case in the Patent Office.

Signed and sealed this 22nd day of September, A. D. 1942.

(Seal)

Henry Van Arsdale,
Acting Commissioner of Patents.